UNITED STATES PATENT OFFICE.

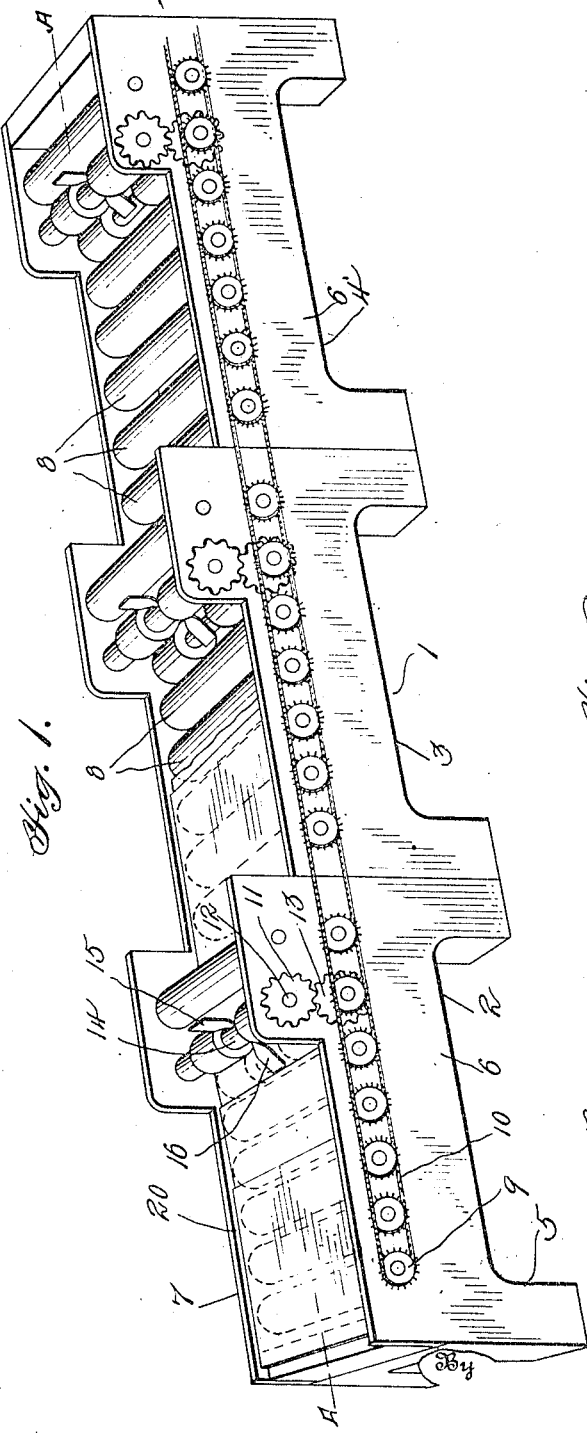
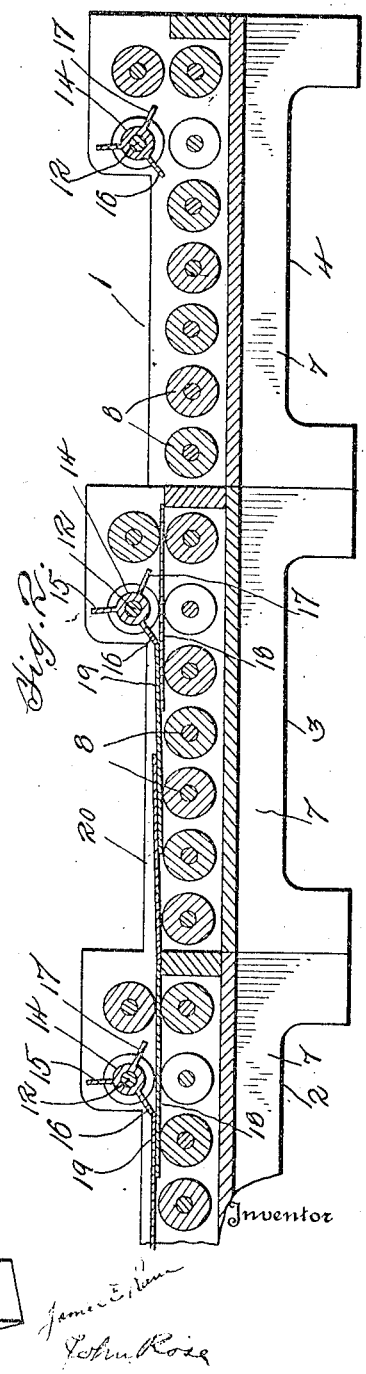

JAMES E. KANE AND JOHN ROSE, OF YORKVILLE, OHIO.

CONVEYER.

1,298,348.   Specification of Letters Patent.   Patented Mar. 25, 1919.

Application filed January 2, 1918. Serial No. 210,080.

*To all whom it may concern:*

Be it known that we, JAMES E. KANE and JOHN ROSE, citizens of the United States, residing at Yorkville, in the county of Jefferson and State of Ohio, have invented certain new and useful Improvements in Conveyers, of which the following is a specification.

This invention relates to improvements in conveyers, and has for its object to provide means for conveying metal or other plates used in various manufacturing operations.

Another object of the invention is to provide a conveyer for plates having means whereby the plates will be prevented from overlapping one another.

A still further object of the invention is to provide a sectional conveyer for plates having automatic means for controlling the movement of the plates.

With the above and other objects in view, we have invented the device illustrated in the accompanying drawings, in which, Figure 1 is a perspective view of our device, and, Fig. 2 is a section taken on the line A—A of Fig. 1.

Like reference characters indicate corresponding parts throughout the following specification and in the views of the drawings in which 1 consists of a conveyer for metallic or other plates including a number of sections 2, 3 and 4, each of which sections are formed of a stand 5, the sides 6 and 7 of which form bearings for conveyer rollers 8 extending throughout the entire length of the table, said rollers being connected to gears 9 operated by a sprocket chain 10. Gears 11 are provided on shafts 12 on one end of the table for gearing with the gears 13 on the adjoining table for operating said sprockets. Frictionally carried on the shaft 12 is a sleeve or hub 14 having radially disposed fingers 15, 16 and 17, one of which is adapted to assume engagement with the upper surface of an advancing plate and to be held by the latter in the path of a second plate 19 following the first plate 18 in superposed relation whereby the front edge of such second plate is engaged and said plate held stationary until the first plate has passed from beneath said finger. When the plate 18 has advanced out of contact with an overlying finger, the sleeve 14 is released so as to frictionally rotate with the shaft 12, permitting the following plate 19 to advance. As many tables as may be required can be used to form a conveying train in order to carry plates any desired distance. Flanges 20 may be provided on each end of the rollers 8 to cause the plates to travel in a straight path on the said rollers. Tables of various sizes and constructions may be used depending upon the requirements of the special work at hand. The frictionally rotated sleeve 14 may have any required number of fingers thereon depending upon the character of material on the conveyer and more than one sleeve may be used if required. The fingers are made preferably of flat steel.

Having thus described our invention, that which is claimed as new and desired to be secured by Letters Patent is:

1. In a conveyer for sheets, means for preventing the feeding of sheets in superposed relation, said means comprising a constantly rotated shaft overlying the path of travel of said sheets, a hub frictionally carried by and rotatable on said shaft, and fingers carried by said hub, said fingers being so disposed that one thereof rides upon the top surface of an advancing sheet and obstructs the advance of a second sheet in superposed relation to the first-mentioned sheet.

2. In a conveyer for sheets, means for preventing the feeding of sheets in superposed relation, said means comprising a member rotatably mounted over the path of travel of said sheets and out of engagement with sheets traveling in said path, a plurality of spaced radial fingers carried by said member, said fingers being so disposed that one thereof rides upon the top surface of an advancing sheet in a position presenting its end in arresting relation to a second sheet having its front end in closely overlapping relation to the first-mentioned sheet, and that the next succeeding finger automatically assumes like riding relation to such second sheet when the first-mentioned sheet has passed out of reach of said fingers.

In testimony whereof we affix our signatures in the presence of two witnesses.

JAMES E. KANE.
JOHN ROSE.

Witnesses:
F. A. NUNLEY,
J. R. GILEREIST.